United States Patent
Park et al.

(10) Patent No.: US 11,602,657 B2
(45) Date of Patent: Mar. 14, 2023

(54) REALISTIC FIRE-FIGHTING TRAINING SIMULATOR

(71) Applicant: ELECTRONICS AND TELECOMMUNICATIONS RESEARCH INSTITUTE, Daejeon (KR)

(72) Inventors: Su Ran Park, Daejeon (KR); Ung Yeon Yang, Daejeon (KR); Hyung Ki Son, Daejeon (KR); Hae Dong Kim, Daejeon (KR); Hong Kee Kim, Daejeon (KR); Kyung Ho Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 27 days.

(21) Appl. No.: 17/325,459

(22) Filed: May 20, 2021

(65) Prior Publication Data
US 2021/0370117 A1 Dec. 2, 2021

(30) Foreign Application Priority Data
Jun. 1, 2020 (KR) .......................... 10-2020-0066086

(51) Int. Cl.
A62C 99/00 (2010.01)
G09B 5/06 (2006.01)
(Continued)

(52) U.S. Cl.
CPC .............. *A62C 99/0081* (2013.01); *G09B 5/06* (2013.01); *G09B 9/00* (2013.01); *G09B 19/003* (2013.01)

(58) Field of Classification Search
CPC ....... G09B 19/003; G09B 9/00; A62C 99/0081
See application file for complete search history.

(56) References Cited

U.S. PATENT DOCUMENTS 5,562,572 A * 10/1996 Carmein ................. A63B 22/02
198/779
5,980,256 A * 11/1999 Carmein ................. G09B 9/165
482/902
(Continued)

FOREIGN PATENT DOCUMENTS

CA       2464128 C   *  9/2011 ........ A63B 21/00181
JP    2020-004060 A       1/2020
(Continued)

OTHER PUBLICATIONS

Seon-Hui Bak et al., "Implementation of Portable SAM Training System for Virtual Reality Technology", Proceedings of KIIT Conference, 2018.6, p. 155-156.

*Primary Examiner* — Robert J Utama
(74) *Attorney, Agent, or Firm* — LRK Patent Law Firm

(57) ABSTRACT

A fire-fighting virtual reality simulator allows the trainee to move in a virtual space in various complex virtual fire disaster situations and perform a suppression of a virtual fire and a confrontation training. An experience interactive simulator for providing a trainee with a floor movement that may occur in a fire disaster situation so that the trainee wearing HMD in a virtual fire-fighting training has the same sense of feeling as that in an actual fire-fighting training is provided. For the realistic content experience, a physical floor movement, such as tilting, falling, and shaking of the floor is reproduced using a base motion, thereby providing a floor movement that enables a sense of feeling similar to a fire disaster situation.

13 Claims, 5 Drawing Sheets

(51) Int. Cl.
  *G09B 19/00* (2006.01)
  *G09B 9/00* (2006.01)

(56) References Cited

U.S. PATENT DOCUMENTS

2012/0122062 A1   5/2012   Yang et al.
2016/0042656 A1   2/2016   Lee et al.

FOREIGN PATENT DOCUMENTS

| KR | 10-2009-0119747 A | | 11/2009 | |
|---|---|---|---|---|
| KR | 20150131722 A | * | 11/2015 | |
| KR | 10-2017-0088495 A | | 8/2017 | |
| KR | 10-1797453 B | | 11/2017 | |
| KR | 101797453 B1 | * | 11/2017 | ............... G09B 9/00 |
| KR | 10-2019-0072747 A | | 6/2019 | |
| KR | 10-2019-0118369 A | | 10/2019 | |
| KR | 10-2019-0139068 A | | 12/2019 | |
| WO | WO-2017131286 A1 | * | 8/2017 | ............. A62C 99/00 |

\* cited by examiner

REALISTIC FIRE-FIGHTING TRAINING SIMULATOR

CROSS-REFERENCE TO RELATED APPLICATION

This application claims priority to and the benefit of Korean Patent Application No. 10-2020-0066086, filed on Jun. 1, 2020, the disclosure of which is incorporated herein by reference in its entirety.

BACKGROUND

1. Field of the Invention

The present invention relates to a virtual reality simulator, and more specifically, to a realistic fire-fighting training simulator that supports fire confrontation training of individuals or firefighters in preparation for dangerous fire accidents or casualty incidents.

2. Description of Related Art

In recent years, virtual reality content is being developed from simply providing an audiovisual-oriented experience to providing an experience expanded to the five senses, including touch, smell, etc. which are the senses of real experiences. In order to provide a perception of being in a virtual space in practice, various methods and apparatuses for supporting interactions with virtual objects or characters or moving and exploring the virtual space, for example, treadmills, are developed and used. The realistic content experience technology of today is rapidly spreading to various fields, such as exhibition, advertisement, education, and job training, as well as game and entertainment industries. In particular, there is emergence of a new educational solution for military training and fire-fighting training, which are difficult to conduct a confrontation training due to a limitation in reproducing a real situation, such as a war, a major incident, an earthquake, and a fire, and a high risk, a job training in a high-risk environment, and the like.

In recent cases of applying virtual reality technology to the fire-fighting field, training is conducted by executing fire-fighting training content on the existing game experience system and using the existing keyboard or mouse in a posture of standing or sitting in place. Such a method has a low degree of sense of presence and immersion compared to field training, resulting in a low effectiveness of experiential learning. Recently, there are cases of fire-fighting training that use a game controller while wearing a head mounted display (HMD) or that use a treadmill simulator having a movement function specialized in games, but the methods are performed on the basis of devices developed for the game experience and are not appropriate for fire-fighting training.

SUMMARY OF THE INVENTION

The present inventor has devised the present invention by seeking a method of providing a trainee with an experience having a high degree of sense of presence and immersion in a situation in which the trainee wears an immersive display for virtual training.

According to one aspect of the present invention, there is provided a fire-fighting virtual reality simulator that, in order to provide a trainee with a training experience similar to actual training in a virtual content-based fire-fighting training, allows the trainee to move in a virtual space in various complex virtual fire disaster situations and perform a suppression of a virtual fire and a confrontation training.

The realistic fire-fighting experience simulator according to the present invention provides an actual experience of a floor movement that may occur in an actual fire situation so that a natural analogous movement in a fire suppression training may be prepared.

In more detail, according to one characteristic of the present invention, an experience interactive simulator for providing a trainee with a floor movement that may occur in a fire disaster situation so that the trainee wearing a head mounted display (HMD) in a virtual fire-fighting training has the same sense of feeling as that in an actual fire-fighting training is provided. For the realistic content experience, a physical floor movement, such as tilting, falling (vertical movement), and shaking of the floor is reproduced using a base motion, thereby providing a floor movement that enables a sense of feeling similar to a fire disaster situation.

Furthermore, a bellows-type safety support device for providing free motion and postural support without physical restraint so that the trainee performs a training similar to an actual fire-fighting training in a situation of immersive fire-fighting training based on a visualization device and holding to prevent the trainee from leaving a certain area of the simulator is provided.

In the case of the existing treadmill simulator, the body of the trainee was restrained with a waist belt for the safety of the trainee. On the other hand, the simulator according to the present invention is designed in a form in which the trainee wears a backpack equipped with an air respirator or an oxygen tank, which is a tool for fire-fighting activity, and receives training, and the oxygen tank worn by the trainee is connected to a bellows-type safety wire of which the length is extendable by a certain length. The safety wire is connected to a weight reduction device for reducing the weight of the oxygen tank so that the trainee is not burdened by the weight of the oxygen tank. Such a structure has been developed to support free posture and motions that do not restrain the body, such as the waist, while providing the trainee with a realistic sense of fire-fighting training.

According to another characteristic of the present invention, there is provided a virtual reality firefighting training simulator including: a firefighting training content application program; a device configured to move a base, on which a trainee stands, on the basis of the application program to provide a trainee with a realistic situation; a device configured to acquire movement/state data related to a movement and a state of the trainee according to the motion of the base to recognize viewpoint direction information, movement information, and posture information of the trainee; and a content operation/motion control unit including a device configured to analyze and process the acquired movement/state data of the trainee to perform a floor motion event inside the application program to execute a motion of the base or perform an image visualization event inside the application program to visualize at least one of a virtual training image of a first-person view of the trainee and a training situation of the trainee in a virtual reality space.

According to another characteristic of the present invention, there is provided a virtual reality firefighting training simulation method including: moving a base, on which a trainee stands, on the basis of a firefighting training content application program to provide the trainee with a realistic situation; acquiring movement/state data related to a movement and a state of the trainee according to the motion of the base to recognize viewpoint direction information, movement information, and posture information of the trainee; and analyzing and processing the acquired movement/state data of the trainee to perform a floor motion event inside the application program to execute a motion of the base or perform an image visualization event inside the application program to visualize at least one of a virtual training image of a first-person view of the trainee and a training situation of the trainee in a virtual reality space.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the advantages and features of the present invention and ways of achieving them will become readily apparent with reference to descriptions of the following detailed embodiments in conjunction with the accompanying drawings. However, the present invention is not limited to such embodiments and may be embodied in various forms. The embodiments to be described below are provided only to complete the disclosure of the present invention and assist those of ordinary skill in the art in fully understanding the scope of the present invention, and the scope of the present invention is defined only by the appended claims.

Terms used herein are used to aid in the explanation and understanding of the embodiments and are not intended to limit the scope and spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Hereinafter, exemplary embodiments of the present invention will be described in detail with reference to the accompanying drawings. In the description of the embodiments, a detailed description of related known functions or constructions will be omitted to avoid obscuring the subject matter of the present invention.

Figure 1:
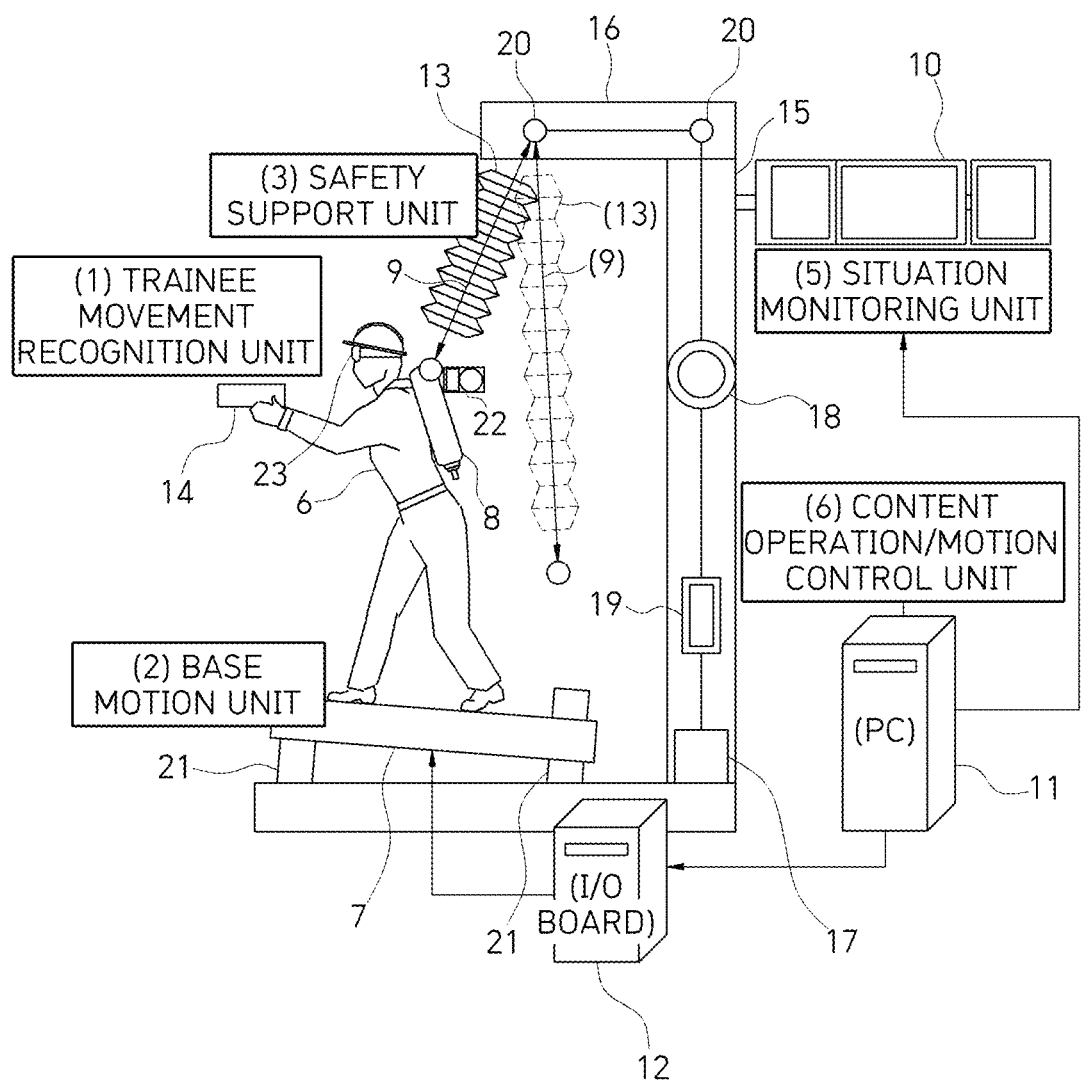
FIG. 1 is a conceptual diagram illustrating a configuration of a realistic fire-fighting training simulator for providing a floor movement according to an embodiment of the present invention.

FIG. 1 is a conceptual diagram illustrating a configuration of a bellows-type realistic fire-fighting training simulator for providing a floor movement according to an embodiment of the present invention.

The simulator according to the present invention includes a total of five units. That is, in order to provide a trainee 6 with a realistic situation, the simulator includes a base motion unit 2 configured to provide a tilt and a vertical movement of a base 7 on the basis of a four-axis motion device; a trainee movement recognition unit 1 configured to acquire movement/state data related to movement and a posture of the trainee 6 according to the base motion unit 2 to recognize and track viewpoint direction information, movement information, and posture information of the trainee 6; a safety support unit 3 connecting a backpack 8 equipped with an air respirator and/or an oxygen tank, which is an actual fire-fighting tool, to a safety wire 9 provided within a bellows-type hose 13 to support safety in free movement/posture of the trainee 6; a content operation/motion control unit 4 configured to operate interactive realistic fire-fighting training content and to control floor movement (i.e., base motion); and a situation monitoring unit 5 configured to visualize a virtual training image of a first-person view and a training situation in a virtual reality space through a display device 10.

In FIG. 1, the content operation/motion control unit 4, the situation monitoring unit 5, and a controller of various electrical/electronic elements (a motor, a power supply, a fan, a speaker, etc.) that are not shown in the drawing may be implemented in a computer 11 (for example, personal computer) inside the simulator, and the base motion unit 2 may be connected to the computer 11 through an input/output (I/O) board 12.

In addition, the trainee movement recognition unit 1 acquires movement/state data of the trainee 6 using an inertial measurement unit (IMU) sensor, a vibration sensor, an ultrasonic sensor, a Head Mounted Display (HMD) equipped sensor, and a position tracking module. The IMU sensor, the vibration sensor, and the ultrasonic sensor 22 used to recognize the movement of the trainee 6 may be installed in a suitable place at which the movement of the trainee 6 is detectable. In addition, an external sensor is installed on an HMD 23 worn by the trainee 6. In addition, the trainee position tracking module may be provided using an HTC VIVE tracker, which is a ready-made product, and the HTC VIVE tracker may be modified to a model fire-fighting nozzle carried by the trainee 6 to construct an interface 14.

In addition, the base motion unit 2 basically uses a four-axis motion device to raise and lower four corners of a quadrilateral floor plate, that is, the base 7 by four vertical movement shafts 21 such that the base 7 is controlled to rise/fall or tilt while maintaining its level. Such a rising, falling, or tilting is controlled according to a training content scenario by the content operation/motion control unit 4 installed in the computer 11 (using the I/O board 12).

In addition, the safety wire 9 of the safety support unit 3 is connected to a motor 17 by passing through a weight reducer 18 and a limit switch 19 inside a column 15 of a frame that is formed in an inverted L-shape with the column 15 and a horizontal beam 16. In addition, the horizontal beam 16 of the support frame is provided with a wire roller 20 for changing the direction of the safety wire 9. The safety wire 9 is covered with a bellows-type hose 13. In FIG. 1, reference numerals 9 and 13 indicated in parentheses denote imaginary images of the safety wire 9 and bellows-type hose 13, respectively, to describe a state in which, when the trainee 6 lowers his or her posture, the safety wire 9 is pulled downward and accordingly the bellows-type hose 13 is stretched and unfolded. The configuration of the safety support unit 3 will be described in detail below.

Figure 2:
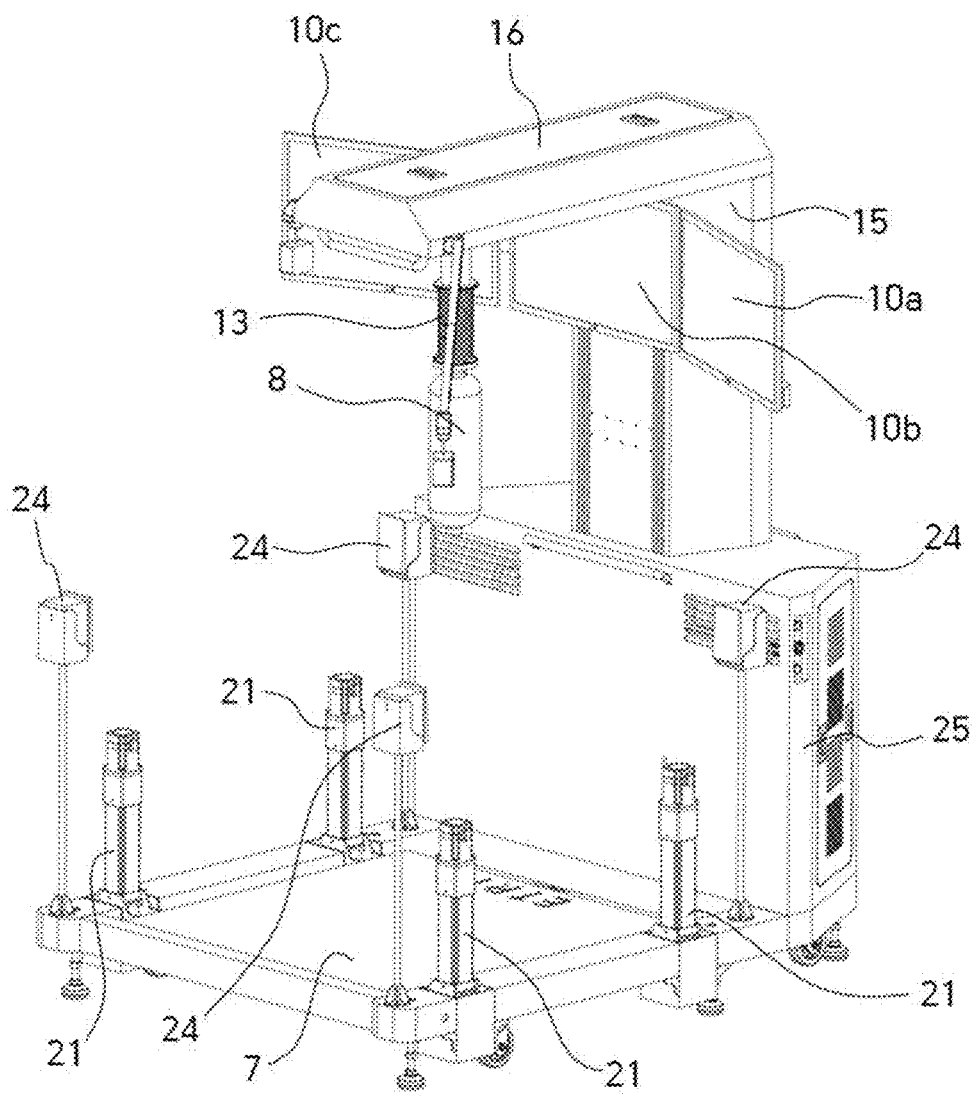
FIG. 2 is an exemplary diagram illustrating a prototype of the realistic fire-fighting training simulator shown in FIG. 1.

FIG. 2 is an exemplary diagram illustrating a prototype of the realistic fire-fighting training simulator shown in FIG. 1. The overall support frame includes a lower part composed of the base 7 having a quadrangular shape and the two vertical movement shafts 21, a side part composed of the column 15 and an electric console 25, and an upper part composed of the horizontal beam 16. The electric console 25 may have the computer 11, the I/O board 12, the motor 17, and other electrical parts, such as a power distributor, a control panel, a fan, a woofer, etc. installed thereto. The situation monitoring unit 5 is divided into three liquid crystal displays (LCDs) 10a, 10b, and 10c.

A training content image is provided to an HMD worn by the trainee standing on the base 7 having a quadrangular shape, and a training content sound is provided through a loudspeaker 24 installed in front of and/or behind the base 7.

The trainee, while wearing the HMD 23 and carrying the backpack 8 on his or her back, stands on the base 7 and performs fire-fighting training in response to a motion of the base 7 controlled by the content operation/motion control unit 4 according to the training content. In other words, when the base 7 performs a motion of left and right tilt and/or back and forth tilt, vertical movement (a falling situation), etc., the trainee takes a posture and behaviour corresponding to a floor movement in a fire suppression. A virtual reality scene provided to the trainee may be displayed on the HMD 23 worn by the trainee, and a virtual reality sound may be output through the loudspeaker 24 and a woofer (not shown). The safety of the trainee against an accident that may occur according to the base motion may be ensured by the safety wire 9 covered with the bellows-type hose 13.

The posture and movement of the trainee performing the virtual reality fire-fighting training are acquired as movement/state data of the trainee using the sensors of the trainee movement recognition unit 1, the HMD installation sensor, and the position tracking module (e.g., a nozzle type HTC VIVE tracker) and are transmitted to the content operation/motion control unit 4. The content operation/motion control unit 4 displays the posture and movement of the trainee to the outside through the situation monitoring unit 5 and the display device 10 attached thereto such that the posture and movement of the trainee are monitored by a manager or a discipline officer or reviewed by the trainee himself/herself at a later time. The situation monitoring unit 5 may also display and present a virtual training image displayed on the HMD in the point of view of the trainee.

Figure 3:
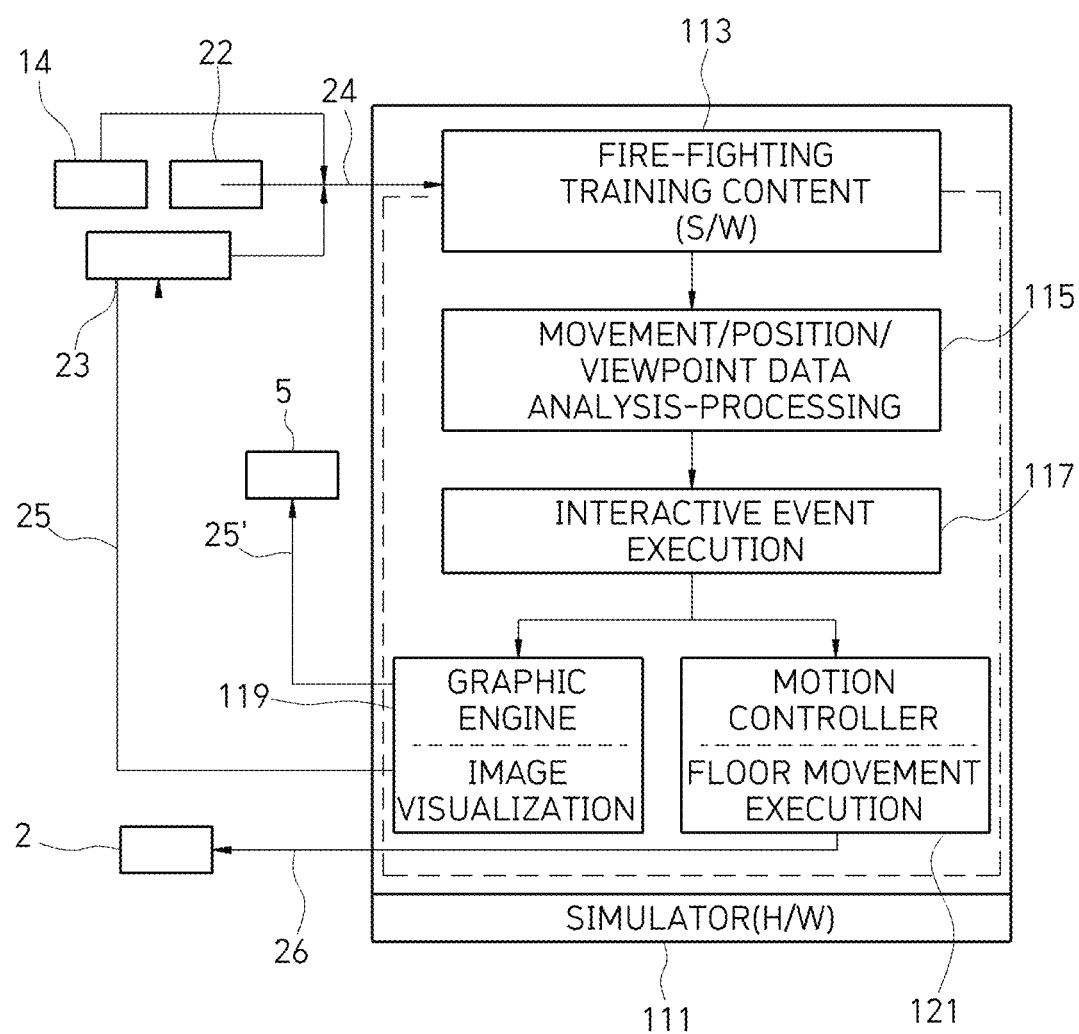
FIG. 3 is a diagram illustrating the operation of the simulator according to the present invention.

FIG. 3 is a diagram illustrating the operation of the simulator according to the present invention, which shows a relationship between the HMD 23 worn by the trainee 6, the interface 14 implemented using an HTC VIVE tracker of a model nozzle held by the hand of the trainee 6, a hardware simulator 111 (i.e., hardware constructed as in FIG. 1), and game engine based software 113 (i.e., fire-fighting training content) executed by the content operation/motion control unit 4.

The trainee movement recognition unit 1 acquires movement/state data 24 of the trainee in an actual space, such as position information of the trainee on the base 7, movement information when walking or stopping, height information when standing or lowering the posture in a stationary state, etc., using the IMU sensor (a sensor that detects front/rear, up/down, and left/right axial movements in a three-dimensional (3D) space, and includes an acceleration sensor and a gyroscope sensor for detecting three-axis rotations of pitch, roll, and yaw) installed in the simulator, the vibration sensor, the ultrasonic sensor 22, the position tracking sensor mounted within the interface 14 modified by attachment of a HTC VIVE tracker of a model fire-fighting nozzle, and an external sensor installed on the HMD 23. The trainee movement recognition unit 1 transmits the acquired movement/state data of the trainee to a movement/position/viewpoint data analysis-processing module 115 inside the fire-fighting training content application program 113 of the content operation/motion control unit 4. Here, the movement/state data 24 of the trainee includes six-degrees of freedom (DOF) information of a full body posture, gaze information, and the like of the trainee.

The transmitted data is linked with the interactive fire-fighting training content application program 113 installed in an operation computer (e.g., the computer 11 shown in FIG. 1) located inside the simulator. The fire-fighting training content application program 113, upon execution, recognizes the received movement/state data 24, such as the movement, location, and viewpoint of the trainee, and performs the movement/position/viewpoint data analysis-processing module 115 to execute an interactive event 117 in the virtual training content. The interaction event includes an image visualization event 119 that transmits image signals 25 and 25' to the HMD 23 and the display device 10 of the situation monitoring unit 5 using a graphic engine and reproduces the image signals 25 and 25', and a floor motion event 121 that executes a floor motion using a motion controller. When the floor motion event 121 occurs, a motion control command 26 is transmitted to the base motion unit 2 to execute a floor motion (i.e., a tilt and/or a vertical movement of the base).

Hereinafter, each component of the simulator according to the present invention will be described in detail with reference to FIGS. 1 to 3 described above.

In order to increase the effectiveness of realistic fire-fighting training, an interactive experience that provides a high degree of immersion and a realistic sense of presence is very important. Providing such a realistic virtual experience requires a process of tracking state information of a trainee in real time in a real space, accurately recognizing the state information, rapidly analyzing and processing the acquired data, and generating an interactive event in a virtual world.

To this end, the trainee movement recognition unit 1 uses a combination of the IMU sensor, the vibration sensor, the ultrasonic sensor, etc. which are mounted on the simulator, and the external sensor installed on and interworking with the wearable HMD 23 to thereby rapidly and accurately track the posture and movement of the trainee. Such a movement recognition operation (acquisition of posture/motion data of the trainee) based on multiple sensors (i.e., the IMU sensor, the vibration sensor, the ultrasonic sensor, the position tracking sensor of an HTC VIVE tracker interface manufactured in the form of a fire-fighting nozzle model, etc.) supports correcting a limitation, such as a data omission or a recognition error that may occur in a single sensor, through a corrective action using various pieces of sensor information.

In one embodiment, the IMU sensor or the vibration sensor among the sensors used by the trainee motion recognition unit 1 acquires a point in time of movement of the trainee, and the ultrasonic sensor tracks the posture height of the trainee. In other words, since the IMU sensor is a sensor that detects front/rear, up/down, and left/right axial movements in a 3D space, the IMU sensor may detect the point in time of movement of the trainee during a motion experience of the trainee according to the training program (the point in time of movement of the trainee may also be detected by a vibration sensor). Furthermore, the IMU sensor may acquire information related to 360° omnidirectional rotation, a walking movement or a running movement of the trainee.

On the other hand, since the ultrasonic sensor is provided at a location in which the backpack 8 equipped with the oxygen tank is connected to the safety wire 9, the ultrasonic sensor emits ultrasound waves to a fixed object (e.g., the horizontal beam 16) on the upper part to track the posture height of the trainee. For example, the ultrasonic sensor may acquire information related to sitting and standing movements performed by the trainee in real time.

Preferably, the IMU sensor, the vibration sensor, and the ultrasonic sensor may be installed at the connection portion of the backpack 8 (with the oxygen tank) carried by the trainee and the bellows-type hose 13 as denoted by reference numeral 22 in FIG. 1. This is because the portion is the best position to detect the posture or movement of the trainee.

Figure 4:
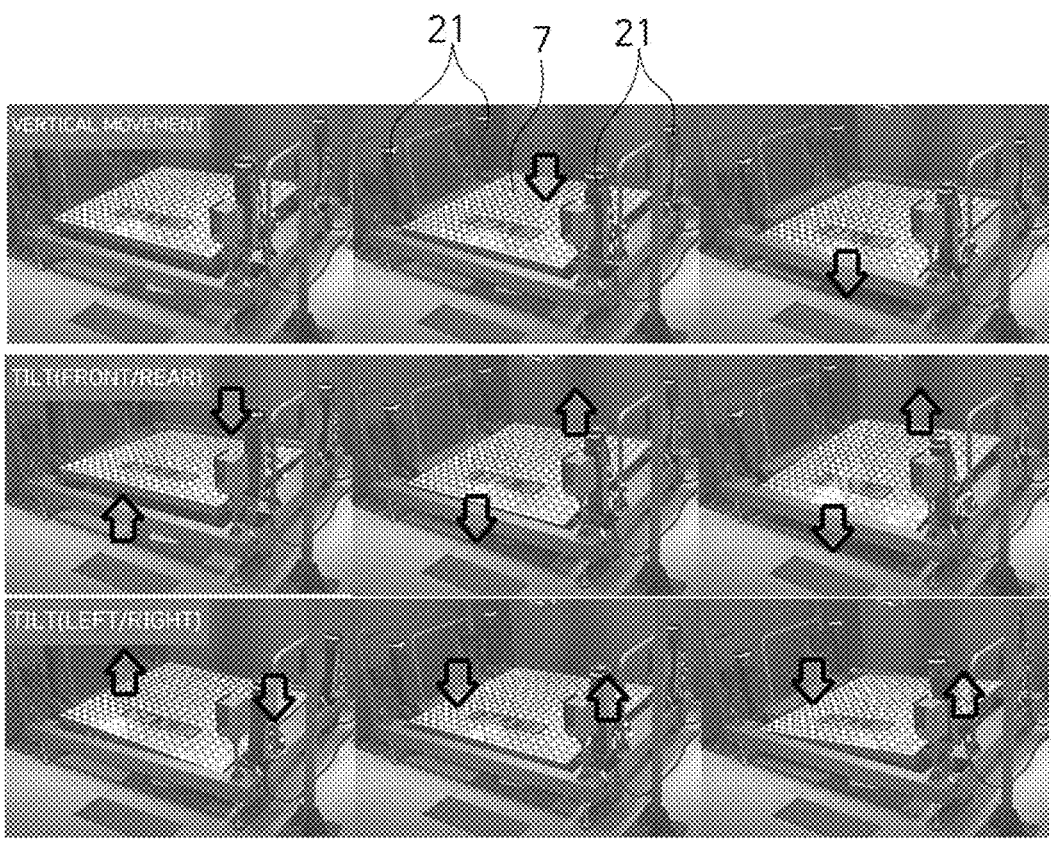
FIG. 4 shows exemplary diagrams illustrating scenes in which vertical movement, forward/backward tilt, and left/right tilt of a base (7) are performed.

The base motion unit 2 controls an input/output control board (the I/O board 12 in FIG. 1) disposed inside the simulator according to a movement of the trainee during experience of the realistic fire-fighting training content or a pre-designed event generation command to generate a base motion (a tilting and a vertical movement). FIG. 4 illustrates scenes in which vertical movement, forward/backward tilting, and left/right tilting of the base 7 are performed by controlling the vertical movement shafts 21 using the four-axis motion device.

In order to configure the safety support unit 3 having a bellows shape, the trainee 6 carries the backpack 8 equipped with the respirator and/or the oxygen tank, which are fire-fighting equipment, and connects the safety wire 9 to the oxygen tank or the connection portion (not shown) of the backpack 8. The outside of the safety wire 9 is covered by the bellows-type hose 13 that is flexibly extendable.

The safety wire 9 connected to the connection portion of the backpack 8 is changed in direction by the wire roller 20 installed on the horizontal beam 16 on the upper part of the simulator and then is connected to the oxygen tank weight reducer 18 located in the middle of the column 15. The weight reducer 18 is provided to support the weight of the oxygen tank and the backpack 8 to support the trainee in free motion and ensure the safety of the trainee during the training of the trainee. A spring balancer by Tigon (a brand name) may be used as the weight reducer 18.

The safety wire 9 passing through the weight reducer 18 is connected to the motor 17 located at the lower part of the simulator (e.g., the electric console 25). The motor 17 serves to adjust (lengthen or shorten) the length of the safety wire 9 according to the height of the trainee. Control of the motor 17 may be performed by a control button (not shown) installed on the electric console 25.

As a safety device for preventing an accident that may occur when a wire rope, that is, the safety wire 9, is cut by the movement of the trainee, the limit switch 19 may be used. The limit switch 19 may be provided using a contact mechanical switch (e.g., a micro switch, a Kolno (a brand name) switch, etc.) or a non-contact sensor (e.g., a reflective/transmissive photo interrupt, etc.). When the cutting of the safety wire 9 is detected by the limit switch 19, the content operation/motion control unit 4 instructs the I/O board 12 to control the vertical movement axis 21 of the four-axis motion device to stop operation of the base 7 or take other measures (e.g., issuing an emergency alarm).

Figure 5:
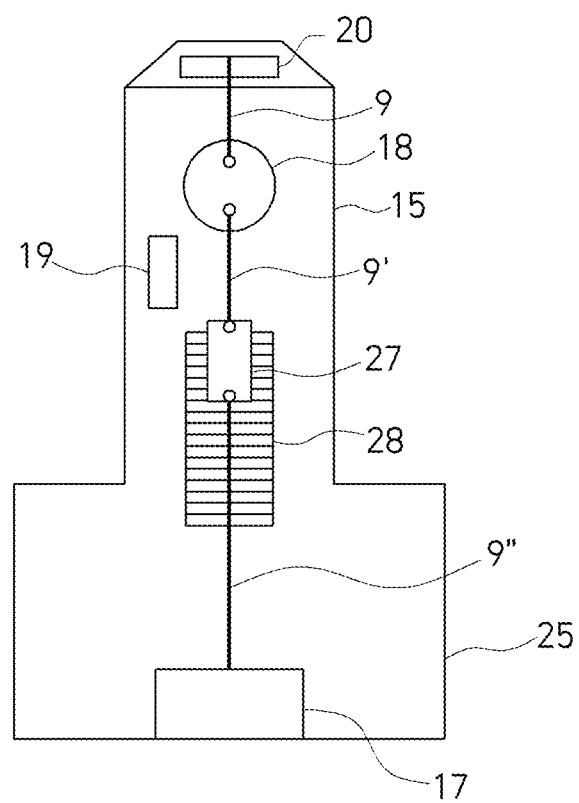
FIG. 5 is a diagram illustrating an arrangement of a safety wire (9), a motor (17), a weight reducer (18), and a limit switch (19) of the simulator.

FIG. 5 illustrates an example in which the safety wire 9, the motor 17, the weight reducer 18, and the limit switch 19 are arranged in the column 15 and the electric console 25 of the simulator.

The weight reducer 18 is located inside the upper part of the column 15, which serves as a frame of the simulator. The motor 17 is mounted within the electric console 25 below the column 15. The weight reducer 18 has one connection part connected to the safety wire 9 connected to the trainee (while the safety wire 9 passes through the wire roller 20 and turns to the front of the column 15 to be exposed to the trainee), and the other connection part connected to a partial wire 9'. The partial wire 9' is connected through a wire connector 27 to another partial wire 9" connected to the motor 17. The wire connector 27 is attached to a wire guard 28 for length extension. The wire guard 28 for length extension protects a wire from friction damage caused by repeated motions of extending and contracting the length of the wire, fixes the length of the wire to prevent the wire from being stretched when the wire is extended at the maximum length, and at a time of contraction of the wire, allows the wire to be naturally wound without twisting. The wire guard 28 is known by names such as a cable carrier, a cable carrier chain, a drag chain, and the like. The limit switch 19 is installed in an appropriate position to detect the cutting of the safety wire 9 or wire 9'. As described above, when a sensing unit of the limit switch 19 detects the cut of the safety line, a cut detection signal is transmitted to the content operation/motion control unit 4 to perform a predetermined safety function.

The content operation/motion control unit 4 is a content operation computer 11 mounted inside the simulator (e.g., in the electric console 25) and performs an execution and operation function of the interactive fire-fighting training content application program 113 and a motion control function as shown in FIG. 3. The trainee movement recognition unit 1 acquires real-time movement/state data of the trainee in an actual space, such as position information of the trainee on a floor plate, movement information when walking or stopping, height information when standing or lowering the posture in a stationary state, etc., performs an analysis and processing function, and generates an interaction event for the processing result to visualize an image in real time on an HMD-based VR display and control a floor motion.

The situation monitoring unit 5 visualizes a first-person view of the trainee output to the wearable HMD 23 to the outside and/or displays the posture and movement of the trainee performing the virtual reality fire-fighting training to the outside. The wearable HMD-based VR display provides the trainee with a high degree of immersion, but a training instructor or a commander at an outside does not know whether a correct response to the training situation is in progress, and therefore the situation monitoring unit 5 is required.

For example, a wide-type display device having three monitors (10a, 10b, and 10c in FIG. 2) connected to each other may be mounted on the simulator such that the training instructor or commander may check the training situation without wearing an HMD, and at the same time, monitor the response of the trainee. The three monitors 10a, 10b, and 10c connected to each other as a monitor may be horizontally arranged through a dedicated mounting device and may perform a display mode control to display a single image in an expanded form or to split three images and visualize the three images on the respective monitors. As an example of the monitor split, the monitors 10a, 10b, and 10c may be used by being split for a training scenario selection screen 10a, a trainee first-person view screen 10b, and a trainee third-person view screen 10c.

A function or process of each element of the present invention described above may be implemented in a hardware component including at least one of a digital signal processor (DSP), a processor, a controller, an application-specific IC (ASIC), a programmable logic device (e.g., a field programmable gate array (FPGA)), etc.), other electronic devices, or a combination thereof, or may be implemented in software alone or in combination with the hardware component, wherein the software may be stored in a recording medium.

As is apparent from the above, unlike the existing safety device, such as a treadmill device, for restraining the back and the waist, the present invention uses a bellows-type safety support device so that free motion and postures as in performing an actual fire-fighting training can be supported in a virtual fire-fighting training situation. In addition, a base motion device for providing a floor movement provides a sense of feeling of vibration, tilt, and vertical movement of the floor so that various virtual situations giving a sense of the floor being moved in a real space can be simulated.

The simulation device, although developed to enhance the degree of immersion and a sense of presence of realistic fire-fighting training content, can be variously applied to an educational system for special job training, such as soldiers, police, paramedics, etc., that require training in a dangerous situation which is difficult to be reproduced, in addition to fire-fighting training, or to an education and training system based on vehicles, such as airplanes and large ships.

Although the present invention has been described with reference to the embodiments, a person of ordinary skill in the art should appreciate that various modifications, equivalents, and other embodiments are possible without departing from the scope and sprit of the present invention. Therefore, the embodiments disclosed above should be construed as being illustrative rather than limiting the present invention. The scope of the present invention is not defined by the above embodiments but by the appended claims of the present invention, and the present invention is to cover all modifications, equivalents, and alternatives falling within the spirit and scope of the present invention.

What is claimed is:

1. A virtual reality firefighting training simulator comprising:
   a base motion unit configured to move a base, on which a trainee stands, to provide the trainee with a realistic situation;
   a trainee movement recognition unit configured to acquire movement/state data related to a movement and a posture of the trainee according to an operation of the base motion unit to recognize viewpoint direction information, movement information, and posture information of the trainee;
   a content operation/motion control unit configured to operate a firefighting training content application program and control the base motion unit; and
   a safety support unit corresponding to a low posture of the trainee and including a safety wire whose length is flexible to be extended to provide the trainee with freedom in movement, wherein the safety support unit further comprises a limit switch configured to detect cutting of the safety line.

2. The virtual reality firefighting training simulator of claim 1, further comprising:
   a situation monitoring unit configured to visualize at least one of a virtual training image of a first-person view of the trainee and a training situation of the trainee in a virtual reality space,
   wherein the content operation/motion control unit is configured to:
   control the base motion unit on the basis of the firefighting training content application program to provide the trainee with a motion of the base;
   receive the movement/state data of the trainee from the trainee movement recognition unit; and
   analyze and process the received movement/state data of the trainee to perform an image visualization event inside the firefighting training content application program.

3. The virtual reality firefighting training simulator of claim 1, wherein the base motion unit comprises a vertical movement shaft that raises, lowers, and tilts the base by a four-axis motion device controlled by the content operation/motion control unit on the basis of the firefighting training content application program.

4. The virtual reality firefighting training simulator of claim 1, wherein the trainee movement recognition unit comprises at least one of an inertial measurement unit (IMU) sensor, a vibration sensor, an ultrasonic sensor, and a position tracking sensor to acquire the movement/state data of the trainee.

5. The virtual reality firefighting training simulator of claim 1, wherein the trainee movement recognition unit comprises:
   a sensor configured to acquire a point in time of the movement of the trainee; and
   a sensor configured to track a posture height of the trainee.

6. The virtual reality firefighting training simulator of claim 1, wherein the content operation/motion control unit is configured to:
   control the base motion unit on the basis of the firefighting training content application program to provide the trainee with a motion of the base;
   receive the movement/state data of the trainee from the trainee movement recognition unit; and
   analyze and process the received movement/state data of the trainee to perform a floor motion event inside the firefighting training content application program.

7. The virtual reality firefighting training simulator of claim 1, wherein the safety support unit further comprises a motor configured to adjust the length of the safety wire according to a height of the trainee.

8. The virtual reality firefighting training simulator of claim 1, wherein the safety support unit further comprises a weight reducer connected to the safety wire to support a weight of the trainee to support the trainee in free motion and ensure safety of the trainee.

9. The virtual reality firefighting training simulator of claim 1, wherein the safety wire of the safety support unit is coupled to a wire guard for length extension.

10. A virtual reality firefighting training simulator comprising:
- a firefighting training content application program;
- a device configured to move a base, on which a trainee stands, on the basis of the fire-fighting training content application program to provide a trainee with a realistic situation;
- a device configured to acquire movement/state data related to a movement and a state of the trainee according to the motion of the base to recognize viewpoint direction information, movement information, and posture information of the trainee; and
- a content operation/motion control unit including a device configured to analyze and process the acquired movement/state data of the trainee to perform a floor motion event inside the firefighting training content application program to execute a motion of the base.

11. The virtual reality firefighting training simulator of claim 10, wherein the content operation/motion control unit further comprises a device configured to analyze and process the acquired movement/state data of the trainee to perform an image visualization event inside the firefighting training content application program to visualize at least one of a virtual training image of a first-person view of the trainee and a training situation of the trainee in a virtual reality space.

12. A virtual reality firefighting training simulation method comprising:
- moving a base, on which a trainee stands, on the basis of a firefighting training content application program to provide the trainee with a realistic situation;
- acquiring movement/state data related to a movement and a state of the trainee according to the motion of the base to recognize viewpoint direction information, movement information, and posture information of the trainee; and
- analyzing and processing the acquired movement/state data of the trainee to perform a floor motion event inside the firefighting training content application program to execute a motion of the base.

13. The virtual reality firefighting training simulation method of claim 12, further comprising analyzing and processing the acquired movement/state data of the trainee to perform an image visualization event inside the firefighting training content application program to visualize at least one of a virtual training image of a first-person view of the trainee and a training situation of the trainee in a virtual reality space.

* * * * *